Jan. 5, 1932.  W. SPÄTH  1,839,354
DEVICE FOR MEASURING MOMENTS OF TORSION
Original Filed Feb. 26, 1930
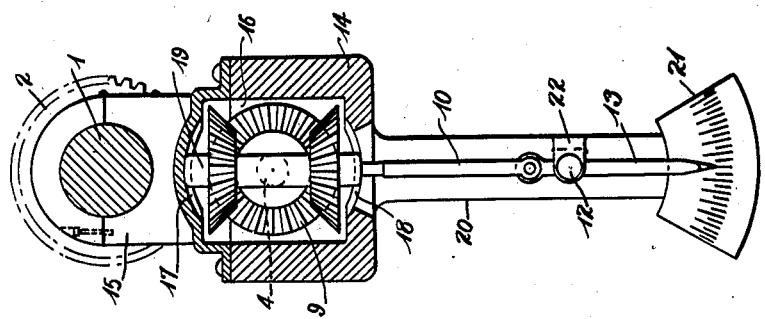
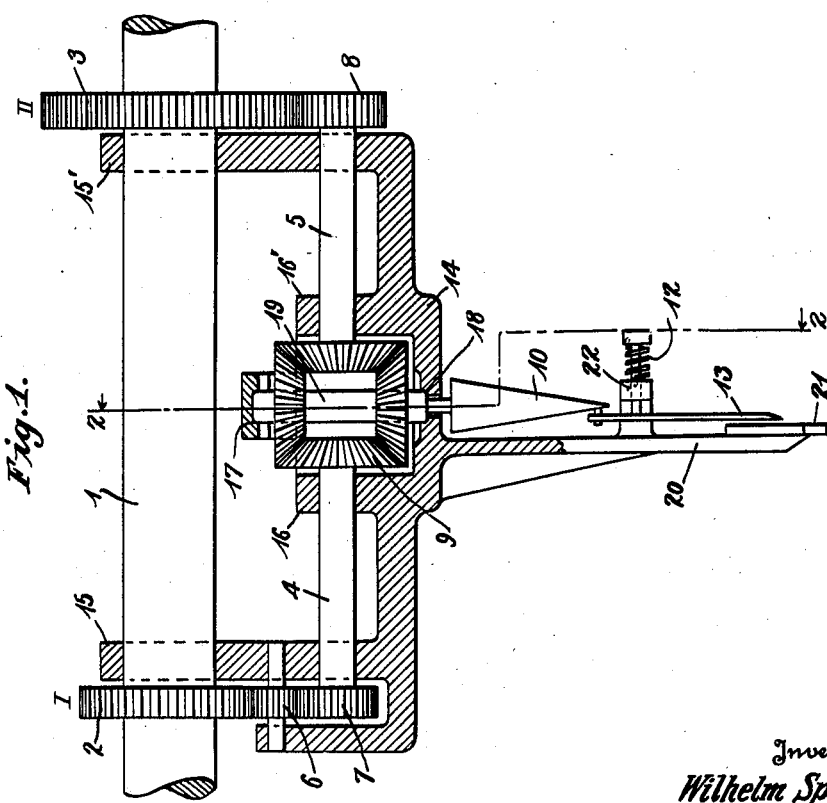
Inventor
Wilhelm Späth
By
Knight Bros.
Attorneys Patented Jan. 5, 1932

1,839,354

UNITED STATES PATENT OFFICE

WILHELM SPÄTH, OF BARMEN, GERMANY, ASSIGNOR TO LOSENHAUSENWERK, OF DUSSELDORF-GRAFENBERG, GERMANY

DEVICE FOR MEASURING MOMENTS OF TORSION

Application filed February 26, 1930, Serial No. 431,591. Renewed November 19, 1931.

This invention relates to devices for measuring moments of torsion in power transmission lines, generaly known as torsion indicators. The essential feature of the new device is that the motions of two spaced transverse sections of the power line to be tested are respectively transmitted to two auxiliary shafts in such a way that the latter are caused to rotate at the same speed in opposite directions when the said two transverse sections are rotating at the same speed, and any variation of the auxiliary shafts from this relative condition of rotation is measured by suitable indicating means. By this fundamental arrangement a simple construction and a direct indication by a stationary indicating device are attained. At the same time it makes no difference whether the power transmission line is one of the shafts performing a function in the machine, for example the screw of a ship, or whether a special torsion rod is used to measure the force. In the first case the device is mounted directly upon the shaft to be tested, in the second case it is preferably inserted as a whole in the power transmission line.

For a more detailed explanation of the invention reference is made to the accompanying drawings showing one form of the invention, wherein Fig. 1 is a front elevation, partly in section of my improved device, and Fig. 2 is a transverse sectional view along line 2—2 of Fig. 1.

The torsion of a shaft 1 between transverse sections I and II is to be measured. At these transverse sections transmission elements 2 and 3 are arranged, for example toothed wheels, which transmit the motion of the main shaft 1 to two auxiliary shafts 4 and 5, in such a way that the two auxiliary shafts are rotated in opposite directions. These auxiliary shafts 4 and 5 are mounted on a frame 14 which is connected to the shaft 1 at suitable pivoted bearings in brackets 15, 15'. Other journals in these brackets are in alignment with corresponding journals in brackets 16, 16' to support shafts 4 and 5. To obtain opposite relation of shafts 4 and 5 there is placed in front of the auxiliary shaft 4 an intermediate wheel 6, rotatably mounted in suitable journals in frame 14, which engages in a toothed wheel 7 fixed on shaft 4; while toothed wheel 3 drives the auxiliary shaft 5 directly through the toothed wheel 8. The nature of these driving connections is unimportant, however; they may be toothed wheels, as shown, or friction wheels, etc. The ratios of transmission are so chosen that the two auxiliary shafts rotate at the same speed. The auxiliary shafts are made as rigid as possible without large moment of inertia; for example they are formed as tubes of relatively large diameter, while the transmission elements are made as light as possible. The two auxiliary shafts transmit their motion to a differentially acting transmission device, here shown, for example, as a planetary gear 9, the middle wheels of which are rotatably mounted on a shaft 19, which in turn is connected with an indicating lever 10. Lever 10 is free to deviate from its center, by virtue of a slot at 18 in the base of the frame 14. Likewise the top of the frame at 17, as well as the bottom of it, 18, is formed to allow movement of the middle wheels and the consequent oscillation of shaft 19.

The manner of operation of the device is, in short, as follows: With the main shaft 1 unloaded the two auxiliary shafts run at the same speed in opposite directions, so that the indicating lever 10 stands still, due to the differential action of the gear 9. When the main shaft is loaded a relative displacement between the two transverse sections I and II takes place, and with this, a brief difference in the speed of rotation of the two auxiliary shafts, which causes a displacement of the indicating lever until a state of equilibrium is reached. When the main shaft is unloaded the same procedure takes place in the reverse direction.

In this case the indicating device is quite positively guided. In order to maintain positive connection between all the elements of the transmission mechanism when the main shaft is undergoing rapid changes in load, the indicating device is preferably put under the influence of a spring device 12 tending to pull it in one direction, so that any shocks occurring will be equalized.

By proper selection of the transmission elements a ratio of transmission can be secured which will cause a sufficient deviation of the indicator, which cooperates with a scale upon arm 20 suspended from the frame. However, a second indicating lever 13, suitably pivoted in a bracket 22 and controlled by lever 10, can be used to magnify the motion of the first indicating lever 10, and the resulting indication read upon a scale 21 at the extremity of arm 20.

Having described my invention, I claim:

1. A device for measuring the moment of torsion of a rotatable power transmission line, comprising two rotatably mounted auxiliary shafts, means for transmitting the motion of two spaced transverse sections of said power transmission line respectively to said two auxiliary shafts, said motion transmitting means being adapted to rotate said auxiliary shafts at the same speeds in opposite directions when said two transverse sections of said power transmission line are moving at the same speed, and means for indicating a deviation from the normal rotation of said auxiliary shafts at the same speed in opposite directions.

2. A device as recited in claim 1, in which said indicating means comprises a planetary gear, a pointer, and means for connecting said two auxiliary shafts and said pointer respectively to the three elements of said planetary gear.

3. In combination with a device as recited in claim 1, a spring device tending to pull said indicating means in one direction to maintain positive connections.

WILHELM SPÄTH.